United States Patent Office 3,698,862
Patented Oct. 17, 1972

3,698,862
METHOD FOR THE STORAGE AND SHIPMENT
OF WET PROCESS PHOSPHORIC ACID
Jatinder Jolly, Metairie, La., assignor to Freeport
Sulphur Company, New York, N.Y.
No Drawing. Filed July 17, 1970, Ser. No. 55,944
Int. Cl. C01b 25/18, 25/22
U.S. Cl. 23—165                              19 Claims

ABSTRACT OF THE DISCLOSURE

The undesirable sludge which typically accumulates in shipped or stored wet process phosphoric acid is rendered flowable by the presence in the phosphoric acid of a polymer selected from the group consisting of polyacrylamides, hydrolyzed polyacrylonitriles and salts thereof, and polyethylene oxide, these polymers being present in an amount effective to render the sludge flowable. The flowability of the sludge facilitates unloading of the acid from the shipping or storage vessel in addition to providing other advantages to a shipper of the acid.

BACKGROUND OF THE INVENTION

This invention relates to an improved method of handling and transporting wet process phosphoric acid. More particularly, it relates to a method which renders flowable the solid impurities or sludge which typically accumulates in wet process phosphoric acid.

Phosphoric acid is generally produced by the wet process method. According to this method, phosphate rock is acidulated with a concentrated mineral acid such as sulfuric acid to produce a slurry containing diluted $P_2O_5$ solution and insoluble gypsum. The slurry is drawn off and filtered to produce phosphoric acid having a $P_2O_5$ content of 22 to 30% by weight. This acid is concentrated to a product containing 48–58% $P_2O_5$ and 1.0 to 6.0% solids by weight; 54% $P_2O_5$ acid containing from 2.0 to 4.0% solids is ordinarily produced. It is common practice to use centrifugation or decantation to remove a part of these solids, with the resultant acid being known as "run-of-plant" acid. The acid is then transferred to storage tanks or shipped directly.

The run-of-plant acid contains many soluble impurities which continue to precipitate from the acid with time. This phenomenon is referred to as post-precipitation. The precipitated impurities, commonly referred to as "sludge," include materials such as calcium sulfates (dihydrate, hemihydrate, and anhydrite), sodium and potassium silico-fluorides, potassium phosphates of iron and aluminum, ralstonite type compounds, and many others.

The wet process phosphoric acid, upon standing in storage tanks or during shipments in tank cars, trucks, or barges, deposits a layer of heavy sludge which can make handling of the stored or shipped acid exceedingly difficult and frequently unfeasible. Some producers prefer to pump run-of-plant acid to storage tanks where the acid is cooled and aged for several days, after which it is subjected to centrifugation to remove the post-precipitated impurities. Clarification through unassisted settling is also practiced. These methods, though successful in removing a part of the solid impurities, are uneconomical due to expensive storage capacity being tied up for a long period of time. Moreover, it entails a considerable loss of valuable $P_2O_5$ in the sludge at the bottom of the clarifier or the underflow from the centrifuge since these sludges normally contain 40 to 50% $P_2O_5$. Furthermore, the impurities continue to precipitate in the clarified acid and present further handling problems.

It is the common practice in the industry for the customer to pay only for the acid unloaded and not for the sludge left in the shipping vessel. Normally, the sludge left in the shipping vessel is very hard and does not flow by gravity. The nozzles become plugged during transit and extra manpower is required to loosen the sludge at the bottom in order to get the acid to flow. At times, the sludge is so hard that it requires hammering to open the plugged-up nozzle. It becomes all the more difficult when top-unloading tank cars using air are employed. This virtually makes it impossible to unload all of the acid, and normally 5 to 10% of the sludge is left in the shipping vessel. This accounts for about a 2 to 5% loss of $P_2O_5$.

Since it is not practical to clean the shipping vessel after each trip, the manufacturer normally takes it out of service only after two or three trips. This results in accumulation of several tons of sludge. It becomes an item of expense because of unnecessary freight being paid on the undelivered acid. Moreover, this high-solids sludge is a loss to a producer not engaged in the fertilizer business, where this material might be utilized. It has been proposed to use agitated shipping vessels so that solids may be kept suspended during transit. However, the higher cost of installing, operating and maintaining the agitators does not justify their usage for trucks, tank cars, and medium-sized barges.

For these reasons, it is apparent that a method for preventing accumulations of this hard non-flowable sludge and thereby delivering more of the shipping vessel's contents to the customer would have considerable utility.

Numerous methods have been heretofore proposed to facilitate the problem of handling the sludge in wet process phosphoric acid. These methods fall into two general categories:

(1) The mechanical removal of solids prior to storing or shipping; and
(2) Inhibition of solids precipitation in the acid by the addition to the acid of various additives.

Mechanical separation, employing the techniques of clarification, filtration, and centrifugation, is the most common method being practiced in the industry. However, due to the nature of the solids and high viscosity of the acid, it is difficult to perform these operations efficiently. Moreover, because the rate of precipitation is slow, not only is a large storage volume required for settling, but this expensive storage volume also is tied up for a long period of time, since one month is usually accepted as the time required for post-precipitation to occur to the extent that additional precipitation will not greatly increase the solids content during transit or storage. The sludge formed via aging and settling is hard in nature and does not ordinarily flow by gravity.

The second category pertains to methods for inhibiting the post-precipitation of these solids by adding various additives such as, for example, certain polymers and chelating agents to the acid.

It should be noted that this latter method minimizes precipitation of the solids, whereas it has now been found, in accordance with this invention, that it is not necessary to inhibit post-precipitation in order to effectvely handle the sludge problem. Instead an economical, unique, and improved method for treating wet process phosphoric acid has been found which makes no attempt to inhibit solids precipitation. Instead, the nature of the sludge solids is effectively altered so that the sludge formed is soft and flows freely.

It is therefore a general object of this invention to provide wet process phosphoric acid which can be shipped or stored over an extended time period economically and without the problems normally attendant with sludge formation.

It is another object of this invention to provide a method for economically and conveniently shipping wet process phosphoric acid without the necessity of prolonged aging, clarification by settling, or mechanical removal of solids by centrifugation prior to shipping.

It is another object of this invention to provide a unique and more economical method which, instead of inhibiting solids precepitation, permits the solids to precipitate but in a flowable form whereby they can be easily handled and pumped.

It is a further object of this invention to provide a method which delivers more $P_2O_5$ to the customers by significantly reducing the amount of sludge retained in the delivery vessel.

It is a further object of this invention to provide a method which does not require cleaning the acid shipping vessel after each trip thereby increasing the number of trips which can be made by the vessel before it becomes necessary to take it out of service for cleaning.

It is a still further object of this invention to provide a method which does not require the use of mechanical means of agitation during transit for maintaining the sludge solids suspended in the acid.

These and other objects will be apparent to those skilled in the art from a toal reading of this specification.

SUMMARY OF THE INVENTION

In accordance with the method of this invention, it has been found that a fluid, readily flowable, easy to handle sludge is produced when wet process phosphoric acid is either stored or shipped as an admixture comprising a major amount of acid and a minor amount of a water soluble synthetic polymer selected from the group consisting of:

(1) polyacrylamides;
(2) hydrolyzed polyacrylonitriles and the alkali metal salts thereof such as, for example, the sodium and potassium salts; and
(3) polyethylene oxides.

The admixture of minor but effective amounts of one or more of the above polymers with the acid has the unique effect of altering the properties of the sludge to the point where it becomes softer and more fluid; these properties facilitate removal of the sludge from storage or shipping vessels. The addition of these polymers does not inhibit the solids precipitation but instead permits formation of a sludge which can be easily handled because of its increased fluidity.

DESCRIPTION OF THE PREFERRED EMBODIMENTS

In general, the polymers admixed with the wet process phosphoric acid should have a molecular weight of at least about 5 million, with a molecular weight of about 10 to 12 million representing a preferred range. For example, a preferred polymer is polyacrylamide having a molecular weight of from about 10 to 12 million.

Since wet process phosphoric acid varies in quality from plant to plant, the amount of polymer admixed with the acid will vary for different acids. Moreover, the amount of polymer used also depends upon the impurities present in the acid. Hence, in general, an amount of polymer sufficient to render the sludge flowable will be added to the acid. Normally, it is desirable to admix the polymer with the acid in an amount equal to about 0.0025 to 0.25 lb./ton of phosphoric acid. This addition would be equivalent to 1.25 to 125 p.p.m. in the acid. This treatment is effective at all $P_2O_5$ concentrations; however, normally the polymer addition is made to the acid at 40–58% $P_2O_5$.

The polymer is preferably first prepared as a solution which is then admixed with the acid. Generally, dilute aqueous polymer solutions containing 0.05 to 1.0% by weight of polymer are preferable. However, dilute phosphoric acid containing 5.0 to 30.0% $P_2O_5$ can be used in place of water to prepare the polymer solution. The preparation of the acid miscible polymer solution can take a variety of forms and this invention is not restricted to any particular method for preparing the polymer solution. Total mixing or dissolving time for the polymer is typically between two to eight hours.

The addition of polymer solution to the acid is made in any convenient manner. As the polymer solution can form agglomerates with the acid, precaution should be exercised to insure complete and uniform distribution of the polymer solution throughout the acid. The solution can be added to the acid at any point during its manufacture but preferably is not added prior to any mechanical means of clarifying the acid since this could deplete the amount of polymer in the acid. Since the effectiveness of the polymer depends upon its presence in the acid during shipping or storing, a clarification treatment after addition of polymer will defeat the very purpose of the addition. It is preferable to add the polymer solution to run-of-plant acid as it is being pumped into the shipping or storage vessels. It is important to have uniform mixing, but excessive agitation should be avoidad so as not to degrade polymer effectiveness. The use of centrifugal pumps to transfer the polymer solution is preferably avoided since they have been found to reduce the effectiveness of the polymer.

Temperature of the acid-polymer admixture is not an important factor as long as it is kept below the polymer's degradation limit; however, it is preferably maintained within the range of 50° to 170° F.

Dilute solutions of the polymer are normally added to the acid to be treated, at several points, with adequate mixing of the polymer and the acid in order to accomplish optimum dispersion of the polymer throughout the acid. However, if good mixing facilities are available, the polymer solutions can be added directly to the system at one location instead of at different points. It can be mixed continuously and uniformly in the acid line leading to the storage or shipping tank, thus providing all the mixing in the acid line itself. In another convenient method, a small mixing tank with an adequate agitation is provided. The acid and polymer are mixed in this tank with a small retention time and the treated acid is then pumped directly to the shipping vessel. Though not preferred, the polymer can be mixed with acid in the acid evaporator system; if the polymer is so mixed, the acid is preferably not subjected to any mechanical means of clarification before further handling.

In one preferred embodiment, the mixture of acid and polymer is accomplished at a $P_2O_5$ concentration of 48–58%. The polymer is dispersed in water either using a hydraulic disperser (eductor system) or mechanical dry feeder equipment so as to produce a 0.1 to 0.2% by weight polymer solution. The solution is allowed to age for about four hours before it is mixed with the acid. It is then transferred by a gear pump and sprayed continuously and uniformly into the acid line leading to the shipping or storage vessels. Feed rates of the acid and the polymer solutions are adjusted such that the treatment level varies from 0.01 to 0.04 pound of polymer per ton of acid (5 to 20 p.p.m. acid).

The following examples are provided to further illustrate the invention.

Example 1

Two 100-ton tank cars were loaded with 54% $P_2O_5$ wet process phosphoric acid at 120° F. and shipped to a customer. Both tank cars were top unloading. The contents of one of the tank cars was treated with a sufficient amount of 0.2% aqueous Polyfloc® 1110 solution (a polyacrylamide having a molecular weight of 10 to 12 million and available commercially from the Betz Chemical Co.) to raise its polymer content to 0.02 lb./ton $P_2O_5$ (equivalent to 10 p.p.m. $P_2O_5$). No polymer was added to the contents of the second car, which was used as an experimental control. After fourteen days, both cars were unloaded and the following observations were made:

(a) The control tank car had the unloading tube severely plugged, while the treated tank car was much easier to unload and the unloading tube was not plugged.

(b) The sludge returned with the treated car was 3.4 tons, which was significantly less than the 8.2 tons of sludge found in the control car.

(c) It took only two hours and five minutes to unload the treated car, while it took three hours and twenty minutes to unload the control car.

Example 2

A statistical computer study was made of the sludge returning in a number of tank cars in order to determine the effect of polymer addition. In this study, statistics were compiled for shipment-with and shipment-without polymer addition. Polymer-treated cars contained a sufficient amount of Betz Polyfloc® 1110 (polyacrylamide) to raise the level of polymer to 0.02 lb./ton $P_2O_5$ (10 p.p.m. $P_2O_5$). A 0.2% by weight aqueous solution of polymer was utilized for this treatment. The results are given below:

|  | Untreated tank cars | Treated tank cars |
|---|---|---|
| Number of cars | 96 | 104 |
| Tons of acid shipped | 8,074 | 9,145 |
| Tons of sludge returned | 652 | 282 |
| Percent of acid shipped returned as sludge | 8.1 | 3.1 |

NOTE.—Reduction of acid sludge returned/100 tons of acid shipped= 5.0 tons; percent reduction of acid shipped returned as sludge equals $$\frac{5.0}{8.1} \times 100 = 62\%$$

Example 3

An experiment was conducted to compare the effectiveness of various polymers with an untreated sample. The different polymers tested in this series were Polyfloc® 1110 (polyacrylamide), Separan® AP 273 (polyacrylamide), Aerofloc® 550 (hydrolyzed polyacrylonitrile), and Polyox® Coagulant (polyethylene oxide). In this laboratory test, tall 100 mls. graduated polypropylene cylinders were used. Arrangements were made to equip these cylinders with ⅜″ nozzles at the bottom so that the acid could flow by gravity when the nozzles were opened. In each of the five such cylinders, 1000 mls. of approximately 54% wet process phosphoric acid was added. Aqueous solutions containing 0.2% by weight of each polymer being tested were made before starting the experiment. Five mls. of 0.2% aqueous solution of Polyfloc 1110 were added in the first cylinder, and the cylinder was inverted and rocked several times to evenly distribute the polymer solution in the acid. It was then placed upright on a stand and was allowed to sit for four weeks. The same procedure was repeated with the other three cylinders using 5 mls. of aqueous solution of Separan AP 273, Aerofloc 550, and Polyox Coagulant respectively. The fifth sample was utilized as a control, with no additive being added to the sample. After four weeks, the nozzles at the bottom were opened to observe the flow characteristics, and the amounts of the acid flowing under gravity were measured. Observations are presented in Table I below.

TABLE I

| Experiment | 1 | 2 | 3 | 4 | 5 |
|---|---|---|---|---|---|
| Trade name of the polymer | Control sample | Polyfloc® 1110. | Separan AP® 273. | Aerofloc® 550. | Polyox® coagulant |
| Chemical name of the polymer |  | Polyacrylamide | Polyacrylamide | Hydrolyzed polyacrylonitrile. | Polyethylene oxide. |
| Flow characteristics and the acid. | Nozzle was plugged. Acid did not flow until poked with a glass rod. | Acid flowed freely | Flowed freely after gentle tapping. | Flowed freely after gentle tapping. | Flowed freely. |
| Visual inspection of the sludge left in the cylinder. | Hard | Very soft | Soft | Soft to hard | Soft. |
| Amount of free-flowing acid (mls.). | 900 | 960 | 950 | 950 | 955. |
| Estimated reduction of acid sludge (tons)/100 tons acid shipped. |  | 6.0 | 5.0 | 5.0 | 5.5. |

The above data clearly indicate the improved fluidity of the sludge resulting from the addition of the various polymers to the acid in accordance with the method of this invention.

The above examples and other specific illustrations described hereinabove are illustrative only and such modifications and alterations as would be suggested to one skilled in the art are contemplated to fall within the scope and spirit of the claims appended hereto.

I claim:

1. A method for preventing the hardening of sludge ordinarily formed in wet process phosphoric acid during storage or shipment, thereby maintaining said sludge in a flowable condition and preventing flow blockages caused by hardening of the sludge, without separating the sludge from the acid, which comprises:
    (1) preparing a solution of a water soluble synthetic polymer selected from the group consisting of:
        (i) polyacrylamides,
        (ii) hydrolyzed polyacrylonitriles and the alkali metal salts thereof, and
        (iii) polyethylene oxides,
    said solution being miscible with wet process phosphoric acid, and
    (2) admixing said solution with the wet process phosphoric acid loaded into a storage or shipping vessel to provide an amount of polymer effective to maintain said sludge in a flowable condition, whereby the sludge remains flowable in the acid product.

2. The method of claim 1 wherein said polymer has a molecular weight of at least about 5 million.

3. The method of claim 2 wherein the molecular weight of the polymer ranges from about 10 to 12 million.

4. The method of claim 1 wherein the polymer solution is an aqueous solution.

5. The method of claim 1 wherein the polymer solution is prepared from dilute phosphoric acid.

6. The method of claim 1 wherein the amount of polymer admixed with the acid ranges from about 0.0025 to 0.25 pound per ton of acid.

7. The process of claim 1 wherein the amount of polymer admixed with the acid ranges from about 0.01 to 0.04 pound per ton of acid.

8. The process of claim 7 wherein said polymer is polyacrylamide having a molecular weight of from about 10 to 12 million.

9. The process of claim 1 wherein said polymer is polyacrylamide.

10. The process of claim 1 wherein said polymer is a hydrolyzed polyacrylonitrile.

11. The process of claim 1 wherein said polymer is an alkali metal salt of a hydrolyzed polyacrylonitrile.

12. The process of claim 1 wherein said polymer is polyethylene oxide.

13. A method for shipping wet process phosphoric acid whereby the sludge ordinarily associated with said acid is prevented from hardening, thereby maintaining the sludge in a flowable condition and preventing flow blockages caused by hardening of the sludge, without separating the sludge from the acid, which comprises shipping the acid as an admixture of said acid and a synthetic water soluble polymer selected from the group consisting of:
  (i) polyacrylamides,
  (ii) hydrolyzed polyacrylonitriles and the alkali metal salts thereof, and
  (iii) polyethylene oxides,
said polymer being present in an amount effective to maintain said sludge in a flowable condition, whereby the sludge remains flowable in the acid product.

14. The method of claim 13 wherein the polymer has a molecular weight of at least about 5 million and is admixed with the acid in an amount ranging from about 0.0025 to 0.25 pound per ton of acid.

15. The process of claim 14 wherein the amount of polymer is from about 0.01 to 0.04 pound per ton of acid.

16. The process of claim 15 wherein said polymer is polyacrylamide having a molecular weight of from about 10 to 12 million.

17. The process of claim 15 wherein said polymer is selected from the group consisting of polyacrylamides, hydrolyzed polyacrylonitriles and alkali metal salts thereof and polyethylene oxides.

18. A method for preventing the hardening of the sludge ordinarily associated with wet process phosphoric acid, thereby maintaining said sludge in a flowable condition and preventing flow blockages caused by hardening of the sludge, without separating the sludge from the acid, which comprises treating said acid with a water soluble polymer selected from the group consisting of:
  (i) polyacrylamides,
  (ii) hydrolyzed polyacrylonitriles and the alkali metal salts thereof, and
  (iii) polyethylene oxides,
in an amount effective to maintain said sludge in a flowable condition, and maintaining said polymer in contact with said acid and sludge whereby the sludge remains flowable in said acid product.

19. The method of claim 18 wherein said polymer is a polyacrylamide having a molecular weight of from about 10 to 12 million.

References Cited

UNITED STATES PATENTS

| | | | |
|---|---|---|---|
| 3,186,793 | 6/1965 | Gillis et al. | 23—165 |
| 3,102,548 | 9/1963 | Smith et al. | 137—13 |
| 3,520,313 | 7/1970 | Seymour | 137—13 |
| 3,080,264 | 3/1963 | Zimmie et al. | 134—22 |
| 3,085,916 | 4/1963 | Zimmie et al. | 210—58 X |

FOREIGN PATENTS

| | | | |
|---|---|---|---|
| 637,832 | 3/1962 | Canada | 23—165 |

OSCAR R. VERTIZ, Primary Examiner

G. A. HELLER, Assistant Examiner

U.S. Cl. X.R.

137—13; 210—58

UNITED STATES PATENT OFFICE
CERTIFICATE OF CORRECTION

Patent No. 3,698,862            Dated October 17, 1972

Inventor(s) Jatinder Jolly

It is certified that error appears in the above-identified patent and that said Letters Patent are hereby corrected as shown below:

Column 5, line 46, before "tons" insert -- 5 --.

Signed and sealed this 24th day of April 1973.

(SEAL)
Attest:

EDWARD M. FLETCHER, JR.
Attesting Officer

ROBERT GOTTSCHALK
Commissioner of Patents